Nov. 15, 1938.   M. W. KOSKI   2,136,622
SHINGLE BUTT TRIMMING MECHANISM
Original Filed Aug. 5, 1935   8 Sheets-Sheet 1

Inventor
Matt William Koski
By Charles L. Reynolds
Attorney

Nov. 15, 1938.  M. W. KOSKI  2,136,622
SHINGLE BUTT TRIMMING MECHANISM
Original Filed Aug. 5, 1935   8 Sheets-Sheet 2
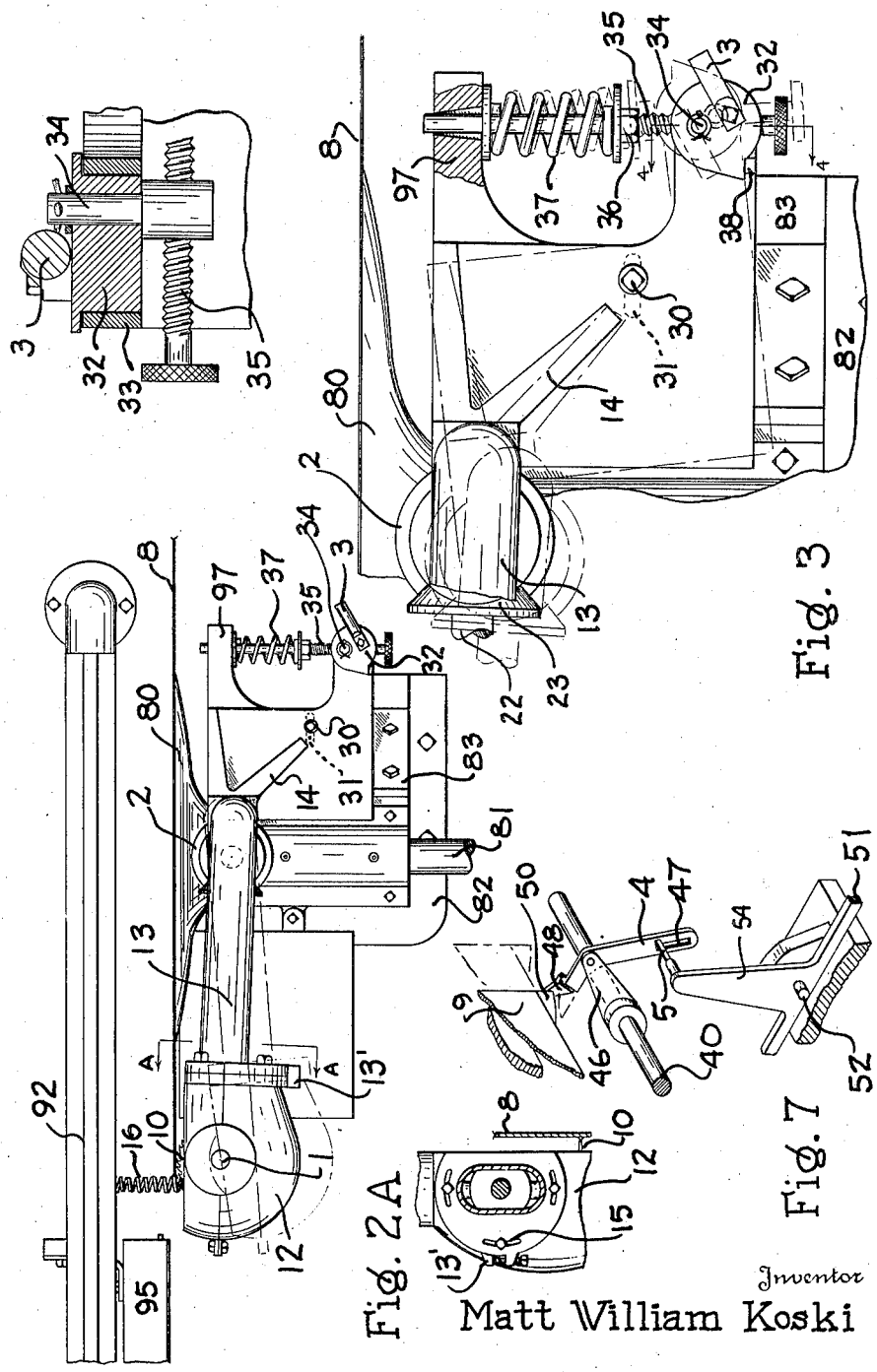
Inventor
Matt William Koski
By Charles L. Reynolds
Attorney Nov. 15, 1938.  M. W. KOSKI  2,136,622
SHINGLE BUTT TRIMMING MECHANISM
Original Filed Aug. 5, 1935  8 Sheets-Sheet 3
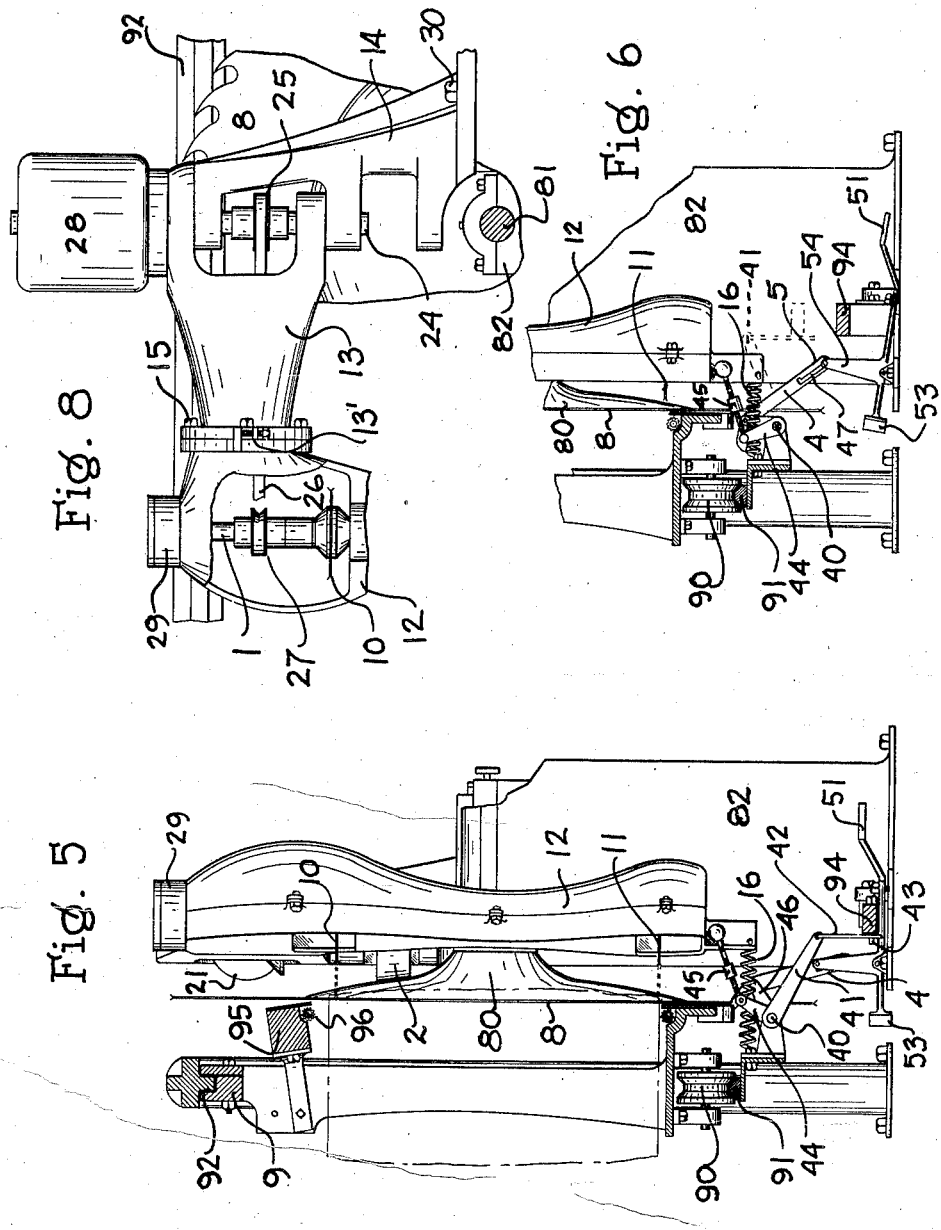
Inventor
Matt William Koski
By Charles L. Reynolds
Attorney

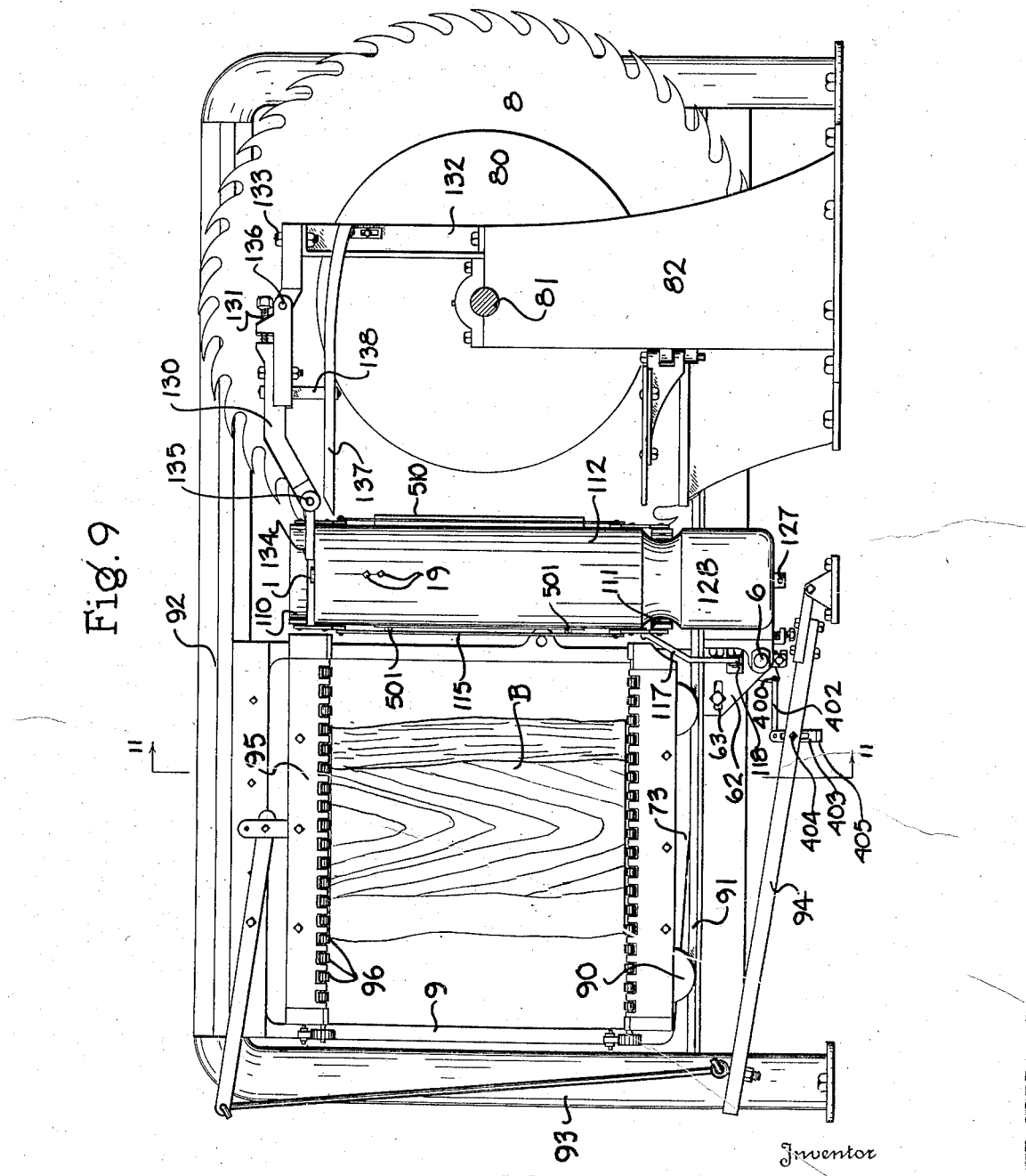

Nov. 15, 1938.  M. W. KOSKI  2,136,622
SHINGLE BUTT TRIMMING MECHANISM
Original Filed Aug. 5, 1935   8 Sheets—Sheet 5
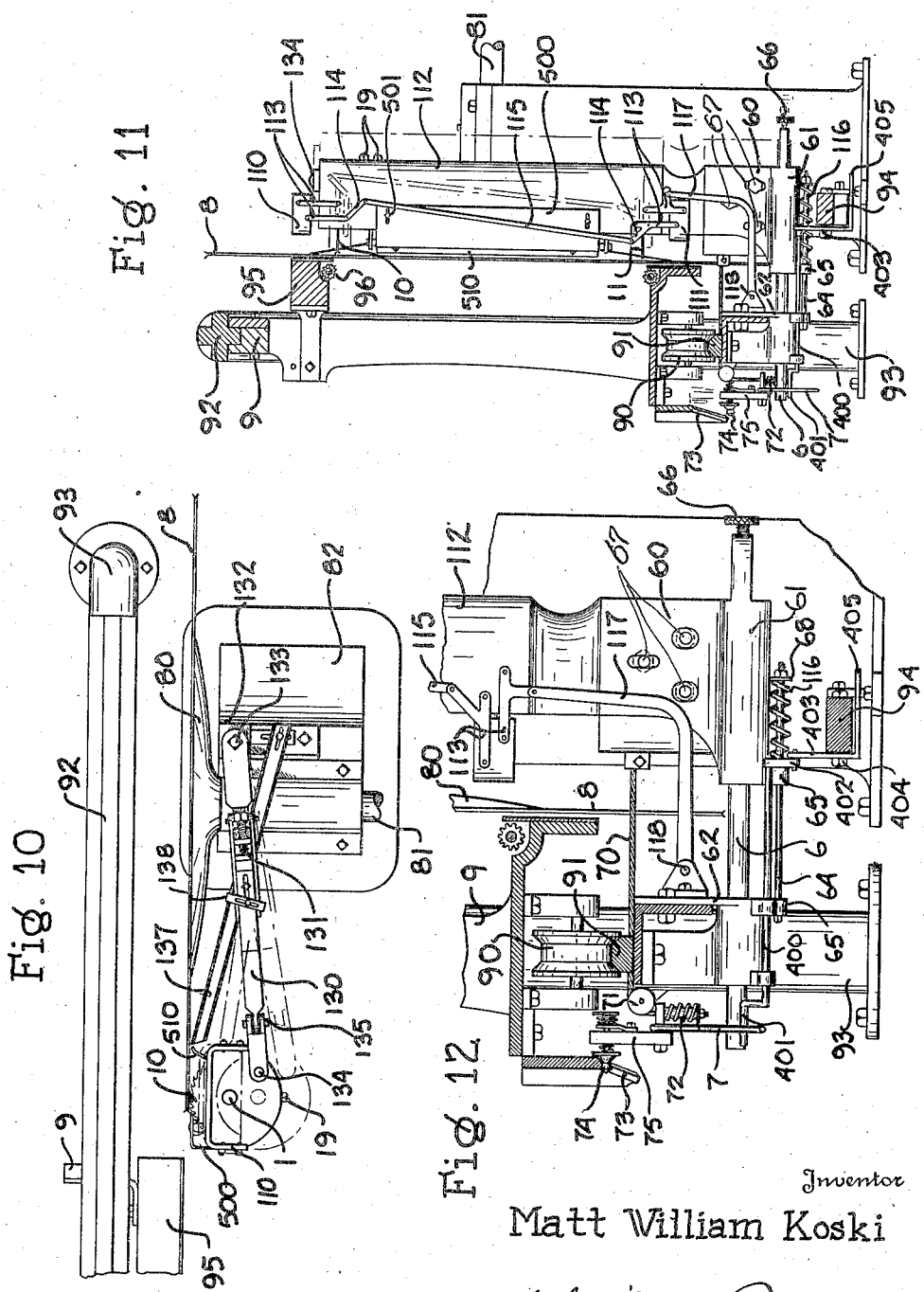
Inventor
Matt William Koski
By Charles L. Reynolds
Attorney

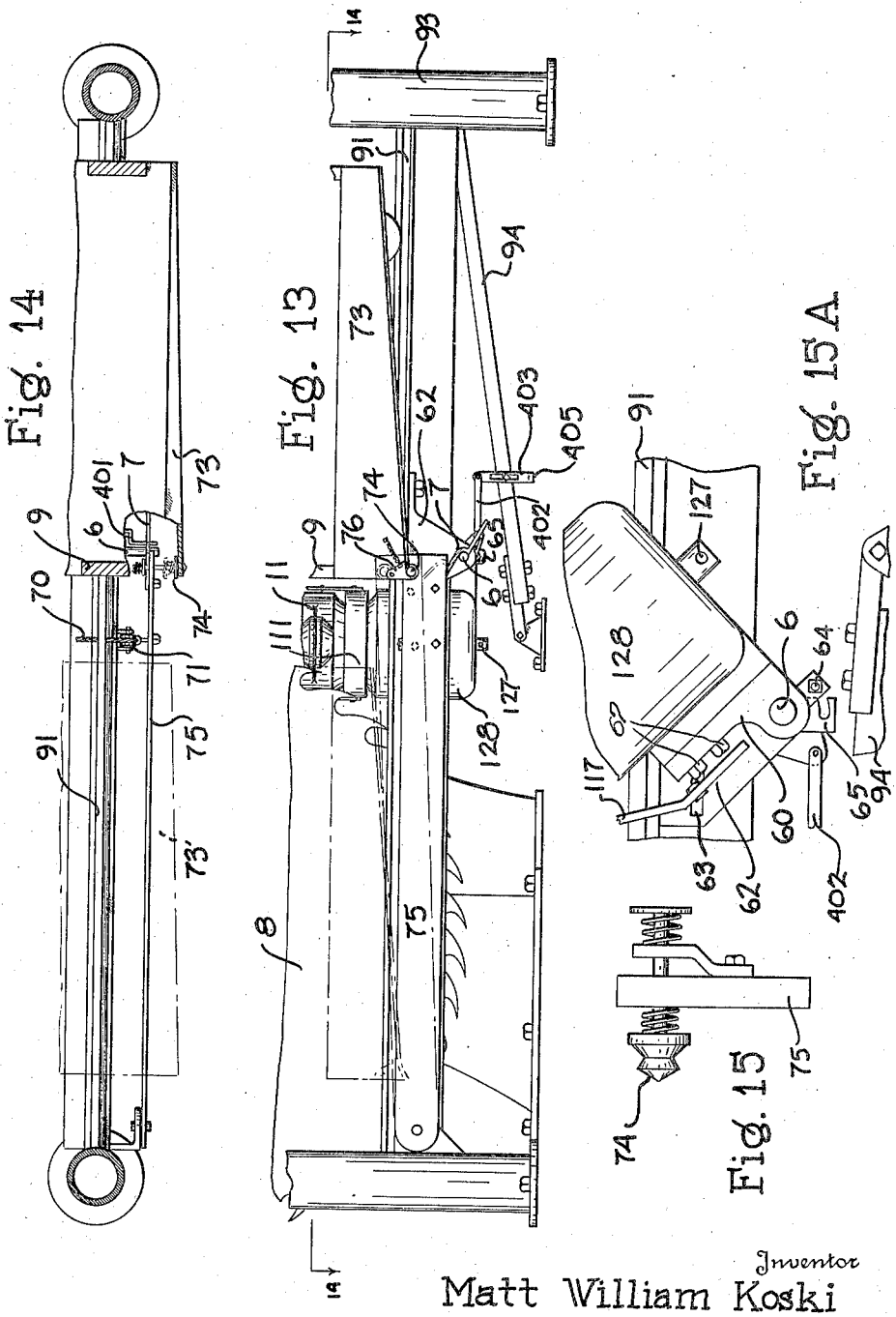

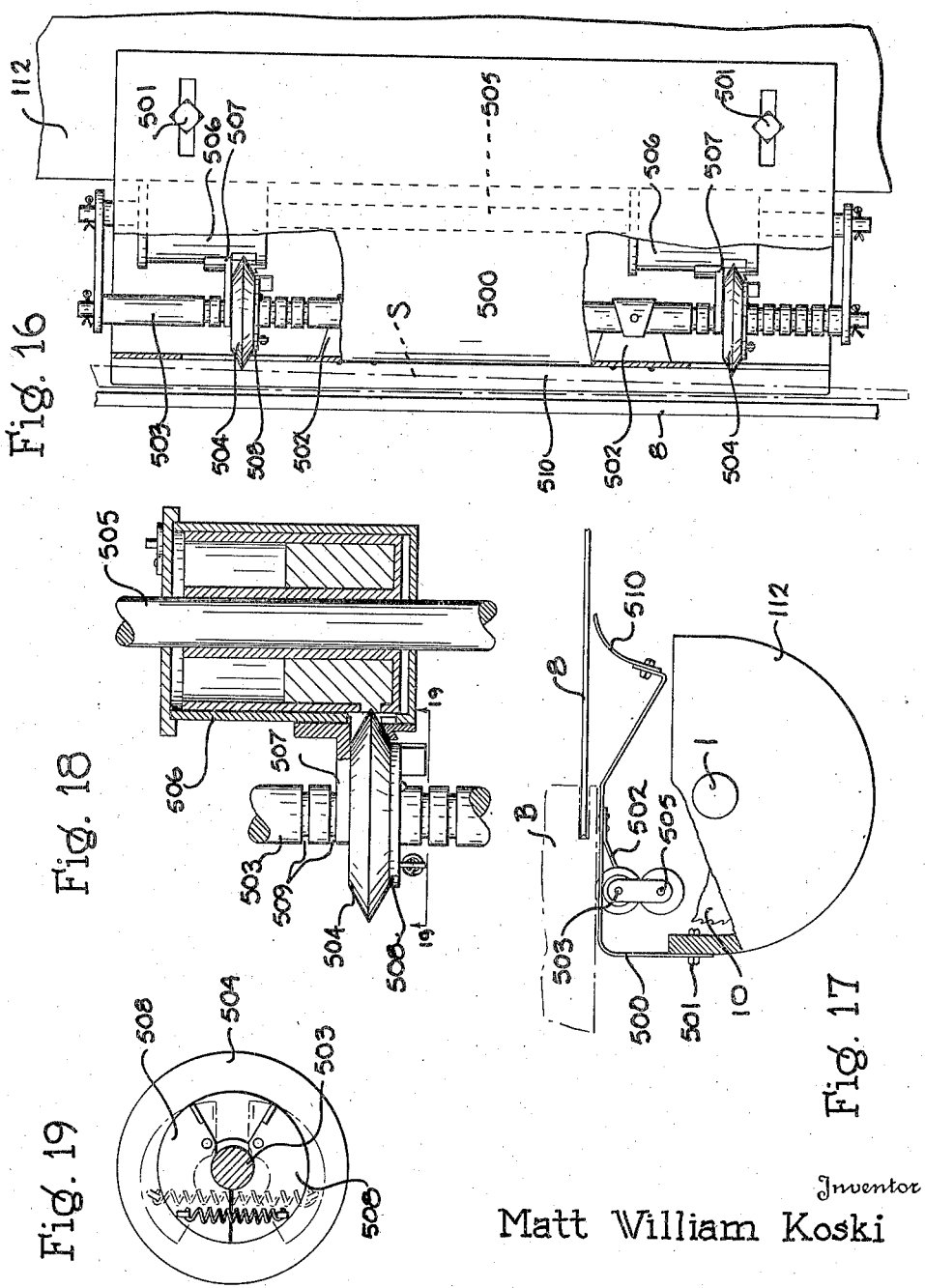

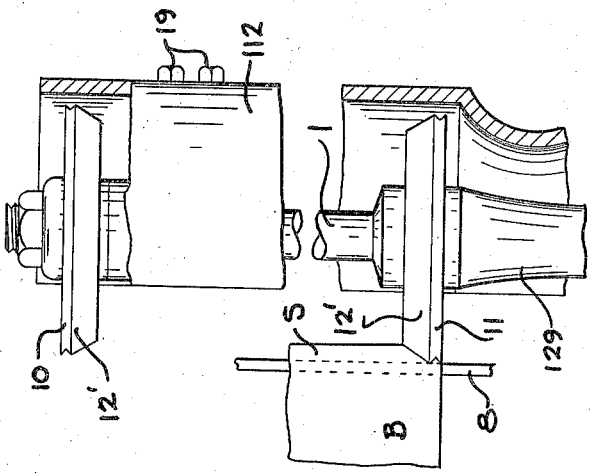
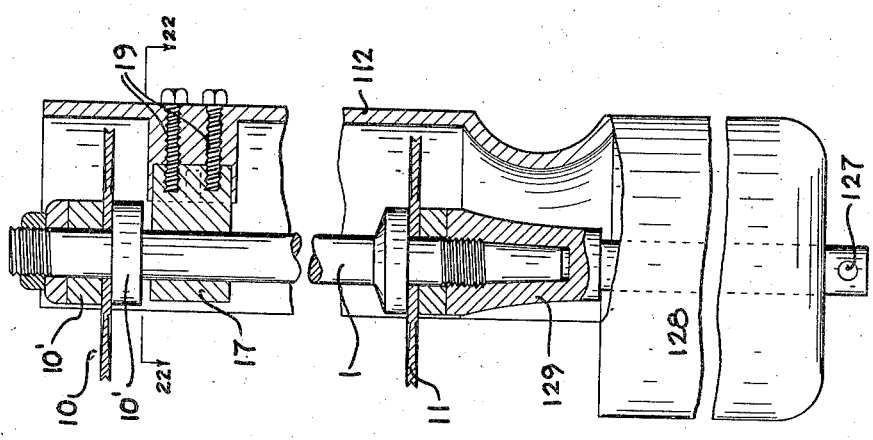
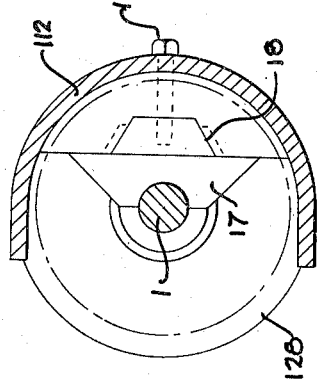
Inventor
Matt William Koski
By Charles L. Reynolds
Attorney Patented Nov. 15, 1938

2,136,622

UNITED STATES PATENT OFFICE 2,136,622

SHINGLE BUTT TRIMMING MECHANISM

Matt William Koski, Raymond, Wash.

Application August 5, 1935, Serial No. 34,703
Renewed September 12, 1938

32 Claims. (Cl. 143—12)

My invention relates to shingle machines, and more particularly to mechanism for trimming the shingles to exact lengths, and/or for beveling their ends, or to mechanism for producing a lay line upon the face of the shingle to gauge the exposure thereof, when laid, or to both these objects in conjunction, the lay line being located at a predetermined distance inside the trimmed butt of a shingle, and precisely parallel to such butt.

It has been proposed heretofore to trim shingles to exact lengths, or to bevel the butts thereof, as shown for example in the Marcoux Patent No. 285,051, but the arrangement therein proposed was objectionable. It is desirable to avoid wear on the saws and strain on the shingle machine by removing the trimming or beveling saws from a position where they can contact with the first spalt taken off the block, which is waste, and which is comparatively thick, or where they can contact shingles in a bad spot in the block. Such an arrangement as shown in the Marcoux patent did not permit the removal or retraction of the trimming or beveling saws for such a purpose. To a certain extent that difficulty was eliminated by the arrangement shown in my prior Patent No. 1,806,979, but in this arrangement the trimming and beveling devices were independently mounted and controllable, and they did not trim the shingles to exact length or squareness since they were not connected, and since they were guided by engagement with the upper and lower spur rolls, the former of which might be slightly canted with respect to the latter.

My present invention, then, is an improvement upon the arrangement typified in the two patents referred to, in that the two trimming saws (and by the term "trimming saws", unless the context otherwise requires, I mean to include beveling cutters as well) are both mounted upon a common arbor which is supported for movement towards and from the plane of the shingle saw, to the end that the two trimming saws may be retracted from normal shingle-engaging position to a position where they will not engage the block, particularly when the first spalt is being taken off, but will automatically return to this normal shingle-engaging position upon return of the carriage, wherein the block is mounted, following its next advance into engagement with the shingle saw, which engagement removes the first shingle.

The primary object of my invention, therefore, is to provide mechanism of the character described, and preferably such mechanism as can be mounted upon and used with an upright shingle machine, which is the type used nearly to the exclusion of all other types of shingle machine.

It is a further object to provide lay-lining mechanism which can be used in conjunction with such trimming mechanism, and which can be retracted in the same manner, or by the same means which retracts the trimming saws, to the end that the lay-lining mechanism will not have to contact the rough and irregular surface of the first spalt, but which when returned to normal position will engage the face of the block, that is to say, the face of the next shingle to be severed from the block, and preferably adjacent the butt end only, thereby to mark a lay line upon this face of the shingle.

It is a further object to provide mechanism which may be employed in addition to and independently of the usually employed retracting devices, to retract the trimming mechanism, and the lay-lining mechanism if employed in conjunction therewith, sufficiently that it will not engage the block during the severance of one or more shingles which may not be intended to be used owing to their having knots, rotten seams, worm holes, or the like, which may render them unfit for use.

It is a further object to devise such mechanism which may be controlled primarily by the treadle which controls the raising of the head block with the upper spur roll, and the reciprocation of the carriage, so that the trimming mechanism may be moved to retracted position by the same action and by the same control which effects stoppage of the carriage and release of the last spalt, preparatory to inserting a new block in the carriage; preferably it is an object to provide additional means to retract the trimming mechanism, which will not require release of the block nor stopping the carriage.

It is an object to provide mechanism of the character indicated, which may be readily accessible for replacement of trimming saws, for inspection, and for adjustment.

Another object is to provide saw guard mechanism which, when the trimming saws are in their normal operative positions, will be out of the way, but which when the trimming saws are retracted will be automatically moved down into position in front of the trimming saws.

Another object is to provide such trimming mechanism which is adaptable to mills which have electricity available for driving the trimming saws, and which is also adaptable to mills which have not such power available, in the latter case making it possible to drive the trimming saws from the shingle saw arbor, preferably by friction drive means.

It is an object to provide such mechanism which incorporates adequate adjustments, to the end that the trimming and lay-lining may be accurately done, and in order that compensation may be made for wear from time to time, and further in order that the device may be adjusted to operate on different lengths of shingles.

It is, of course, an object to provide mechanism of the general character indicated which shall be sufficiently strong and rugged to stand up under the continuous usage to which it will be put in conjunction with the shingle machine, and to provide mechanism which is convenient in operation.

Other objects, particularly such as relate to details and mechanical construction, will be understood as this specification progresses.

My invention comprises the novel trimming attachment, the novel lay-lining attachment, and the novel combination of the two, or either of them with a shingle machine (strictly speaking the shingle machine is not a part of my invention, though the manner of its cooperation with the trimming and lay-lining mechanism does constitute part of the invention), all as is shown in the accompanying drawings and as will be described in this specification and more particularly defined by the claims which terminate the same.

In the accompanying drawings I have shown my invention embodied in two illustrative forms, each adapted to a special condition.

Figure 2 is a plan view of this form of the trimming mechanism, most of the shingle machine being omitted.

Figure 2A is a detail section on the line A—A of Figure 2.

Figure 3 is an enlarged plan view, with parts broken away, of the mechanism shown in Figure 2.

Figure 4 is a section substantially along the line 4—4 of Figure 3, showing a detail of the mechanism.

Figure 5 is a transverse vertical section through the shingle machine, showing the trimming mechanism associated therewith, taken on the line 5—5 of Figure 1, but showing parts in retracted position.

Figure 6 is a detail section on the line 6—6 of Figure 1, showing parts otherwise retracted, as when permitting an unsound shingle to pass without trimming it.

Figure 7 is a perspective view of a detail of the latching and latch-releasing mechanism.

Figure 8 is an elevation, with parts broken away, of a modified drive arrangement.

Figure 9 is a front elevation of a modified form of construction, shown assembled with an upright shingle machine.

Figure 10 is a plan view of the latter form of construction, most of the shingle machine being omitted.

Figure 11 is a transverse vertical section through the machine, substantially on the line 11—11 of Figure 9.

Figure 12 is an enlarged section of the lower part of the machine, substantially on the line 11—11, but showing parts in the retracted position.

Figure 13 is a rear elevation of the lower part of the machine, showing parts in the position they would occupy at the end of the return movement to operative position.

Figure 14 is a section substantially on the line 14—14 of Figure 13.

Figure 15 is a detail of the cam roller and its supporting member.

Figure 15A is a detail elevation showing the manner of tilting the arbor support for removal of the same when it is desired to change the trimming saws or their spacing.

Figure 16 is an elevation, with parts broken away, showing the lay-lining mechanism.

Figure 17 is a plan view, with parts broken away, showing the relationship of the lay-lining mechanism, the trimming saws, and the shingle gate.

Figure 18 is a detail axial section through a part of the lay-lining mechanism.

Figure 19 is a transverse section on the line 19—19 of Figure 18, showing the means whereby the spacing of the lay-lining marking element may be accomplished.

Figure 20 is an axial section along the trimming saw arbor, showing how the same may be disassembled.

Figure 21 is an elevation of the trimming saws, showing beveling cutters associated therewith.

Figure 22 is a transverse section substantially on the line 22—22 of Figure 20.

Figure 1:
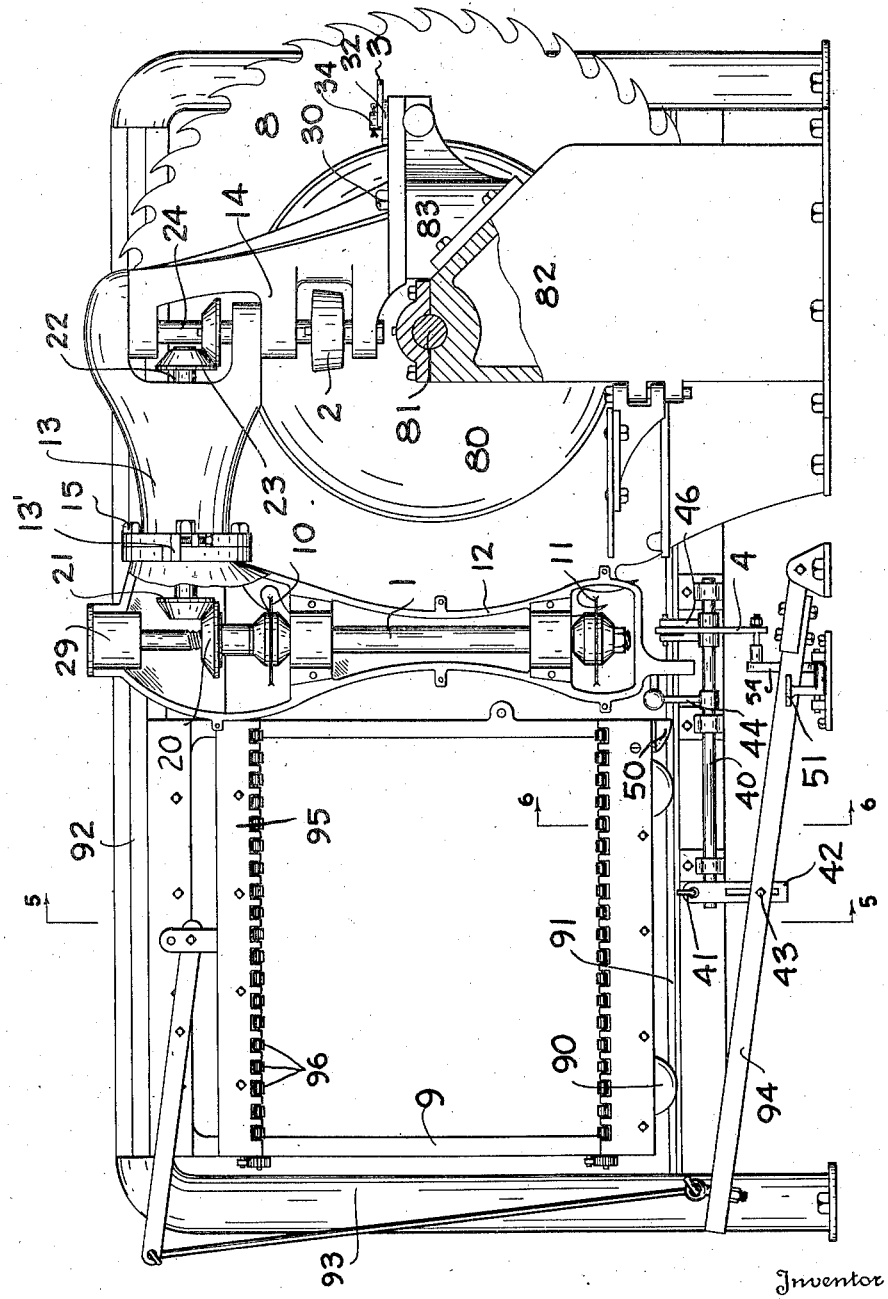
Figure 1 is a front elevation, with parts removed or broken away, showing my invention in a form primarily arranged for friction drive, although having provision for electric drive, shown in conjunction with an upright shingle machine.

The form of the machine shown in Figures 1 to 7 inclusive is adaptable to use in what are generally the smaller mills, which may be in more or less remote localities, and where electric power is not readily available, steam power being supplied by the burning of refuse. While such mills in number constitute a fairly large proportion of the industry, the number of machines operated constitutes only a small part of the whole, yet it is desirable to have a machine which can be employed in such mills. The form of the machine shown in Figures 8 to 22 inclusive is better adapted to the larger mills, where electric power is available, the number of mills thus equipped being small as compared to the mills not electrically equipped, but operating by far the greater number of machines.

The shingle machine illlustrated is substantially the same in each case, and is of a type well known in the industry, and while it does not in itself constitute a part of my invention, the manner in which my mechanism is mounted upon and cooperates with the shingle machine and the parts thereof does constitute part of the present invention, and I shall therefore describe the shingle machine so far as may be necessary to understand my mechanism and the manner in which it cooperates with the shingle machine. It will be observed that parts of the shingle machine are omitted, for clearer illustration, but their presence in the actual machine is to be understood.

The shingle machine incorporates a carriage 9 mounted on rollers 90 running on a track 91 and guided at its upper end in guides 92, the track 91 and guide 92 constituting part of a frame 93. The means for reciprocating the carriage is not shown, nor is the means for stopping such reciprocation. There is shown, however, a treadle 94, pivotally mounted at one end, and connected through suitable linkage to raise or lower a head block 95 containing the upper set of spur rolls 96, which engage the upper end of a block mounted in the carriage, the lower end being held by similar spur rolls. As may be understood from Figure 1, stepping on the treadle 94 raises the head block 95 and releases the shingle block held thereby, and makes it possible to insert a new shingle block. As has been previously mentioned, stepping on the treadle likewise disengages the carriage from its drive means, so that it ceases to reciprocate while a new block is being placed in it. When the new block is in place the sawyer steps off the treadle 94, the head block 95 drops down to engage the upper end of the block, which is thus clamped between the two spur rolls, with a portion projecting beyond the plane of the shingle saw 8, past which the carriage is reciprocable. The first shingle from the block should have a width of at least three inches, and since the block generally runs out to a wedge-like edge, the first cut off the block is a spalt which is waste, and sufficient is cut off to get the face of the cut down to three inches or more in width before the machine starts cutting shingles. Since the sawyer is generally paid according to the number of squares of shingles cut, it is to his advantage to cut the shingles as wide as possible, hence to take off as thick a first spalt as may be possible, but one of the advantages of my invention is that he cannot well project the first spalt very far beyond the projection which is necessary to get down to a three inch width, otherwise it interferes with parts of the trimming and laylining mechanism. Hence another advantage of my invention, as will appear hereafter, is to limit the size of the first spalt, thereby avoiding wastage of material.

The shingle saw 8, as will be understood, is secured to a collar 80 and mounted upon an arbor 81, the arbor in turn being journaled in a frame 82.

The mechanism so far described constitutes part of a well known shingle machine, and its particular form and arrangement are not in themselves my invention. However, in the form shown in Figures 1 to 8 inclusive an arbor 1 has mounted upon it two trimming saws, which to distinguish them are designated 10 and 11, the one being the upper saw and the other the lower saw. The arbor is held in a support 12 so that it is vertically disposed adjacent the cutting edge of the shingle saw 8, and thus forms a guard for the shingle saw, and the trimming saws 10 and 11 are positioned adjacent the upper and lower edges, respectively, of the shingle block held in the carriage 9, so that as the block passes the trimming saws just prior to its engagement by the shingle saw, the trimming saws 10 and 11 cut into the face of the block at top and bottom sufficiently to trim the two ends of the shingle which is just about to be severed from the block, cutting the shingle to exact length and assuring parallelism between its tip and butt ends.

While any convenient means of supporting and driving the trimming saw arbor may be employed, that shown in Figures 1 to 8 is made up of an arm 13 which is hingedly mounted upon a frame 14 to swing upon an axis which extends substantially radially of the shingle saw arbor 81. By providing arcuate slots and bolts, as indicated at 15 (see Figure 2A), the arbor support 12 may be adjusted relative to the arm 13 to swing the lower saw 11 towards or from the plane of movement of the shingle saw 8, thus to line it up with the upper saw 10. Adjustable stops at 13' insure that the arbor support 12 will not accidentally rotate relative to the arm 13 (see Figures 1, 2 and 8).

The arbor may be provided with a bevel friction member 20, with which is engageable a similar member 21 on a shaft 22 supported in the arm 13, this in turn being connected by bevel drive means 23 to a shaft 24 which lies in the hinge axis of the arm 13, and on this latter shaft may be secured a friction drive means 2 which is engageable with the collar 80, so that the arbor 1 may in effect be driven from the main arbor 81. As a variation of this drive, in Figure 8 the shaft 24 is shown as provided with a pulley 25 connected by a belt 26 to a similar pulley 27 on the arbor 1, and an electric motor 28 is connected to the drive shaft 24, and thus the arbor 1 is driven from the electric motor 28, rather than by the frictional connection of the friction drive member 2 with the collar 80. Means are also provided at 29 for the mounting of an electric motor, whereby the arbor 1 may be directly electrically driven, if desired.

Suitable means are provided for moving the friction drive means into and from engagement with the collar 80, where that form of drive is employed, such means being shown best in Figure 3. The member 14 is swingably mounted on a bolt 30 received in a slotted hole 31 in a casting 83, mounted on the frame 82, beneath it, and the entire frame 14 may be swung by rotation of the eccentric 32 in its strap 33, which forms part of the base of the member 14. The eccentric 32 receives a pin 34 eccentrically, in which pin is threaded a bolt 35, which in turn carries a nut and washer 36 and a spring 37. The screw 35 may be rotated to determine the pressure with which the friction drive member 2 will be pressed against the collar 80, the spring reacting between an arm 97, constituting part of the main frame, and the strap 33 which constitutes part of the frame 14. Upon rotating the eccentric 32, however, by means of the handle 3, tension of the spring 37 is relaxed, and the friction drive member 2 being no longer forced against the collar 80, ceases to drive the trimming saw arbor 1. Throwing the handle 3 back until stop means at 38 are engaged again exerts pressure through the spring 37 to throw the friction drive member 2 into engagement with the collar. As the friction drive member wears, the compression of the spring 37 may be adjusted by turning the bolt 35.

Primarily and preferably the movement of the trimming saws 10 and 11 from their operative position is controlled by a member which is operated in controlling the movement of the carriage 9 and the release of the spalt held by the head block 95. Such a member is the treadle 94. The trimming saws, when a new block has just been inserted in the carriage, should be withdrawn to a point where they will not engage the first spalt which projects considerably from the intended face of the block. This first spalt must be taken off and thrown away, since it does not produce sufficiently wide shingles, but the spalt should be limited in size to a point where it will just produce shingles of the proper width; hence the trimming saws should not be capable of movement away from their normal operative position by too great an amount. To accomplish these ends, any suitable mechanism may be employed, and I have shown two such means.

The mechanism shown in the form of Figures 1 to 8, inclusive, includes a rock shaft 40 disposed adjacent the carriage and the arbor support 12, a tension spring 16 connecting the arbor support with the frame 93 to hold the arbor support yieldingly toward the shingle saw 8, against a suitable stop (not shown), and thus to hold the trimming saws in operative position, and mechanism connected between the rock shaft 40 and the treadle 94 on the one hand, and between the rock shaft 40 and the arbor support 12 on the other hand, to move it away in opposition to the spring.

Thus on the rock shaft is mounted an arm 41 to which is connected a slotted link 42, a pin or bolt 43 on the treadle 94 being received in the slot in the link 42. This permits slight oscillation of the treadle, as the carriage reciprocates, without interference with the link. Another arm 44 on the rock shaft 40 is connected to the arbor support 12 by a link 45 which is adjustable in its effective length. Preferably a ball and socket joint is employed since there is twisting movement of the arbor support with relation to the link 45.

Now upon depression of the treadle 94 the pin 43 reaches the lower end of the slot in the link 42, and by sufficient depression thereof to effect control of the carriage and head block, this effects a rocking movement of the rock shaft 40, thereby throwing the arbor support 12 outwardly to move the saws 10 and 11 away from the plane of the shingle saw. This position of parts is shown in Figure 5. The normal operative position of the parts is shown in Figure 2. However, the parts are not, by the mechanism described, held in this position except so long as the treadle 94 is depressed, and it is preferred that there be provided means for latching parts in this thrown-out position, and that such means be automatically operable upon depression of the treadle. To that end an arm 46 is mounted on the rock shaft, and from it depends a link 4 having a slot 47 provided with an angular extension at its upper end, as best seen in Figure 7. Within this slot 47 is received a latch pin 5, which when the rock shaft 40 is rocked to its limit, slips into the angled extension at the upper end of the slot 47, and then locks the link 4 against upward movement, and hence locks the rock shaft against return rotation. This latches the trimming saws 10 and 11 in their outwardly thrown or inoperative position.

With the trimming saws thus thrown out of operative position and latched and held in such inoperative position, the treadle can be released to hold a new block, which has by now been inserted in the carriage, and the carriage again commences to reciprocate with the new spalt projecting beyond the plane of the shingle saw 8. The first spalt is taken off with any contact with the trimming saws, unless it projects too far, whereupon it becomes obvious that the sawyer has tried to take off too much, and after removal of this first spalt the carriage starts back. It is now desirable to return the trimming saws immediately to their normal operative position, and to accomplish this end a cam member 50 on the carriage 9 (see Figure 7) is arranged to engage an end 48 of the link 4, which end is hingedly connected to the remainder of the link. As the carriage was advanced towards the shingle saw this end was merely swung aside upon engagement by the cam 50, without movement of the link, but upon return movement of the carriage this end 48 is depressed, disengaging the slot 47 from the pin 5 and permitting the arbor support 12 to be drawn back to its normal operative position by the extended spring 16. The trimming saws thereupon reach their operative position prior to the next advance of the carriage toward the shingle saw, and thus are in position to trim the next shingle just prior to its severance from the block by the shingle saw.

If, after trimming a number of shingles, some appear which have worm holes or which are otherwise defective, it is preferable to withdraw the trimming saws to avoid dulling them, as they wear away comparatively rapidly. Incidentally, this matter of wear is one reason for providing adjustment in the link 45. To the end that the trimming saws may be moved out of their operative position sufficiently to avoid engagement with shingles which it is not desired to trim, yet without interrupting the operation of the shingle machine, I may provide the pedal 51 pivoted at 52 and carrying a counterweight 53 which normally holds it raised. The lever supporting this pedal is provided with an arm 54 which carries the pin 5, previously referred to. With the trimming saws 10 and 11 in their operative position, pressure on the pedal 51, in the manner indicated in Figure 6, causes the pin 5, engaged with the lower end of the slot 47, to draw down the link 4 to a slight extent, sufficiently to rock the rock shaft 40 slightly and to move the arbor support 12 and the saws 10 and 11 away from a position where the saws will engage the next shingle. Parts are shown in this position in Figure 6. When pressure is relieved from the pedal 51 the spring 16 returns all parts to the normal operative position. Stepping on the pedal 51, therefore, removes the trimming saws slightly, but does not affect the operation of the carriage or the head block 95.

If it is desired to change the trimming saws or to remove them, or to alter their spacing, this may be accomplished by releasing the spring 16, and by disconnecting the link 45, the friction drive means being first thrown out of engagement if employed in the particular machine. The arm 13 may thereupon be swung outwardly, and the two parts of the arbor support 12 may be disassembled, whereupon the bearings for the arbor 1, as shown in Figure 1, are accessible, and the entire arbor may be taken out and different saws put upon it, or the spacers gauging the location of the saws along the arbor may be changed (particularly the spacers controlling the upper saw), to vary the spacing between the saws.

In the form of the mechanism shown in Figures 9 to 22 inclusive the shingle machine is of the type described. The arbor support, which may be designated 112 to distinguish it, is preferably formed with the housing of the motor 128 integral with it. These parts are carried upon a casting 60, being adjustably mounted for vertical adjustment and some tilting adjustment by the bolts 67. The casting 60 is formed with a sleeve 61 receiving a post 6, which projects outwardly from the frame 93, although preferably the post is not directly carried on the frame, but rather upon a bracket 62 which is adjustable longitudinally of the frame by the bolt and slot connections indicated at 63 (see Figure 9). Thus, by providing means whereby the arbor support 112 may be slid lengthwise of the post 6 towards and from the plane of the shingle saw 8, the same ends may be accomplished as in the form first described. In this instance, however, a spring 116 may be received upon a rod 64 fixed to the member 60, pressing against a washer 68, and reacting at the other end against an arcuately slotted lug 65 formed on the main frame, so that the spring constantly urges the arbor support 112 away from the plane of the shingle saw 8. It may be held in its normal position in opposition to the spring 116 by suitable means such as the tension member 70 connected to the latch 7. The latch 7, as may be seen in Figure 13, engages the inner end of the post 6, and when so engaged draws the tension member 70 downwardly over the pulley 71, holding a spring 72 at the end of the tension member compressed. A set screw 66 in the casting 60 engaging the end of the post 6 limits inward movement of the arbor support 112, and enables adjustment of the position of the arbor support and saws towards and from the plane of the shingle saw.

Release of the latch 7, when it is desired to move the arbor support 112 outwardly away from normal position, under the influence of spring 116 may be accomplished in any suitable manner, as for example by a rock shaft 400, which, as before, is adjacent the frame and the arbor support. It is shown as fixedly mounted in parallelism to the post 6, and has a crank arm 401 engaging beneath the latch 7. This rock shaft 400 may be rocked by an arm 402 with which is engageable a slotted link 403, a bolt 404 in the treadle 94 engaging in the slot in this link 403. Upon depression of the treadle 94 the rock shaft 400 is rocked sufficiently that the crank arm 401 throws the latch 7 upwardly out of engagement with the post 6, whereupon the spring 116 moves the arbor support 112 outwardly, drawing the tension member 70 outwardly and the latch 7 upwardly.

A second releasing means might be employed here, as in the mechanism first described. Such a second release is shown at 405, projecting forwardly from the link 403 sufficiently that it can be engaged by the sawyer's foot to be depressed without depressing the treadle 94. By stepping on the release 405 the link 403 is drawn down to kick out the latch 7 in the event bark, a split off piece, or the like gets between the block and the trimming saws (thereby preventing their proper functioning), yet the head block 95 is not released nor the carriage stopped. The latch and trimming saws are returned to normal position automatically upon the next return stroke of the carriage, as will be made clear, if the interfering matter has dropped out. If not, by stepping on the treadle the carriage is stopped and the jam cleared by hand.

To return parts to their normal position I provide a cam 73 on the carriage 9, this cam being inclined with its higher end at the end of the carriage distant from the shingle saw 8, and inclined also with relation to the plane of the shingle saw, so that it is only engaged when the latch has been released, as may be best seen in Figure 12. This cam may be engaged by a cam roller 74 carried upon a member 75, guided for movement in a vertical plane only, so that it may move axially, and so that by vertical movement of the roller the member 75 and the latch 7, with which the member 75 is connected, will be moved downwardly. The inclination of the cam 73 is calculated to move the latch 7 substantially to a point of engagement with the post 6, but a final pivotally mounted terminal 76 (see Figure 13) effects a sufficient downward kick to the roller 74, just as the roller leaves the cam 73, to compress the spring 72, and to insure reengagement of the latch 7 with the post 6.

This reengaging mechanism operates substantially in the same manner as that in the form first described. The arbor support with its trimming saws is moved outwardly upon depression of the treadle 94 to stop the reciprocation of the carriage and to raise the head block 95. The arbor support is automatically latched in this thrown-out or inoperative position. A new block is then inserted, and the carriage again commences to reciprocate, advancing toward the shingle saw to cut off the first spalt, but the latch is at that time disengaged, and the roller 74 does not engage the cam 73 until the carriage starts back after cutting off the first spalt. When it completes its return movement, after the first advance toward the shingle saw, the latch is again reengaged and the arbor support with its saws has been drawn back to its normal operative position, and latched in that position, whereupon as the carriage next advances toward the shingle saw to cut off the first shingle, the trimming saws begin to operate and trim the ends of the first shingle just prior to its severance from the block by the shingle saw.

The upper end of the arbor support must be prevented from swinging on the post 6, and any suitable steadying means to this end may be employed. For example, as is best shown in Figure 10, an arm 130 is adjustable in effective length by the screw 131, and is hinged to a bracket 132 at 133. It is also hinged at 134 to the upper end of the arbor support 112. It is provided with a hinge connection at 135 to permit vertical adjustment of the arbor support, and a similar adjustment is provided at 136 (see Figure 9). Any one of these joints may readily be taken apart to permit swinging of the arbor support in the manner indicated in Figure 15A, as will be explained later.

Remembering that a strip is taken off the upper end of each shingle, it may be desirable to provide means for disposing of this waste strip entire, and if such is the case, this may be done by providing a trough 137 supported from the arm 130 by a suitable bracket 138. This is located and adjustable with the arm 130 so that it receives the strip cut from the upper end of each shingle and conveys it to point where it may be disposed of, without interference with the shingles. However, in many instances there may be provided above the upper trimming saw 10 a hogging head (not shown) which cuts up this waste strip into small particles which can be used as fuel.

It is desirable to provide saw guards which, when the upper and lower trimming saws are retracted from their normal operative position, will move into place in front of the operating edges of these saws, and to this end I provide the guards 110 and 111. Each of these guards may be supported from the arbor support 112 by parallel links 113, one of these parallel links being provided with an arm 114, which arms are connected by a link 115, and the whole system may be swung by a link 117 connected at 118 to the frame, so that when parts are in the normal position, shown in Figure 11, the guards 110 and 111 stand back of and above and below, respectively, the saws 10 and 11, but when the arbor support 112 is retracted, as in Figure 12, the movement communicated to the parallel link system by the anchored link 117 effects movement of the guards into position in front of the edges of the respective saws. The anchorage at 118 may readily be disconnected for swinging of the arbor support about the post 6.

Such swinging of the arbor support is desirable to permit the arbor to be removed for inspection, for repair, or for changing the spacing between the saws 10 and 11. It may be accomplished by disconnecting the arm 130 from the arbor support, by disconnecting the anchorage at 118, and then by rotating the arbor support on the post 6, carrying the rod 64, with respect to the fixed arcuate bracket 65, in the manner indicated in 15A. This disengages the rod 64 from the machine frame, and permits the entire arbor support to be drawn lengthwise off the post 6, after which it may conveniently be disassembled.

The assembly of the arbor in the arbor support is shown in Figures 20, 21 and 22. The motor 128 is provided with a shaft 129 which is threadedly engaged with the lower end of the arbor 1. The bearings contained in the motor constitute the lower bearing for the arbor 1, and at its upper end it may be supported in a bearing 17 having a wedge connection, indicated at 18, with the arbor support 112. By withdrawing the bolts 19 the bearing 17 may be withdrawn, and if the arbor be turned and the motor shaft 129 be held, or vice versa, the arbor may be disengaged from the motor. To enable the motor shaft 129 to be held or turned it may be provided with a hole 127 for the insertion of a bar.

It will be understood that various spacers 10' are employed on the arbor 1 to locate the trimming saw 10 with respect to the bearings, and hence to effect its accurate spacing from the trimming saw 11, and upon disassembly of the arbor and associated parts, these spacers may be placed above the saw 10 or below it, thus to control the spacing of this saw from the saw 11, or, as shown in Figure 21, a beveling head 12' may be applied beneath the saw 10 and above the saw 11 to bevel the butt end of a shingle at the same time that its ends are trimmed. The action of trimming, beveling and severing a shingle is illustrated in Figure 21, the block B being shown in line with the shingle saw 8, and a shingle S being shown in the process of being trimmed, beveled and severed.

It is desirable in many instances to mark upon the face of a shingle, at the proper distance from the trimmed butt, a line which serves as a gauge to the roofer to determine the proper exposure. For instance, in what is called a 16-inch shingle, which would be trimmed to 15¾ inches, the proper exposure would be 4 inches, and hence the lay line should be marked exactly 4 inches from the accurately trimmed butt. Any suitable marking equipment may be provided for this purpose, but preferably this should be mounted and movable with the trimming saws, and should be adjustable with or at the same time as the adjustment of the trimming saws, so that it will be accurate at whatever spacing the trimming saws may be placed. Mechanism which will accomplish this lay-lining is illustrated in Figures 16 to 19 inclusive.

Preferably a spring support 500 is adjustably fixed to the arbor support 112, as by the bolt and slot connection at 501, whereby it can be accurately adjusted in and out. For reasons which will appear later I prefer that a second bracket 502 support the lay-lining mechanism from the member 500, and on the brackets 502 is carried a vertical shaft 503. Marking rollers 504 are carried on this shaft 503 and adjustable longitudinally thereof. A second shaft 505 parallels and is supported from the shaft 503, and an ink magazine 506 is supported upon and slidable longitudinally of the shaft 505. Brackets 507 enable the magazine 506 to rest on the marking rollers 504, so that the magazine follows the adjustment of the associated marking roller, the edge of which wipes the ink saturated material within the magazine.

The marking roller is provided with cooperating jaws 508, spring held together and adapted to be spread apart, but when held together engaging in grooves 509 accurately spaced by predetermined distances on the shaft 503, and thus by spreading the jaws 508 the rollers may be readily adjusted lengthwise of the shaft 503, carrying the magazine 506 with them, and may be accurately placed by engagement of the jaws 508 in any selected groove 509.

The edges of the marking rollers 508 should be an equal distance from the plane of the shingle saw 8, the bolt and slot connection at 501 permitting such adjustment. The shingle block B is canted by the spur rolls on the carriage, first with the upper end out to cut a butt from the top of the block, and thereafter the block is canted with its lower end out to cut a butt from the lower end of the block. Usually this canting is not alternate, but two butts are cut from the top and then two butts from the bottom, and so on, but in each instance the butt end is slightly farther out than the tip end, as the shingle is being severed from the block, hence, as is seen in Figure 16, the marking roller 504 which is adjacent the butt end of the shingle being severed is the only one which contacts the face of that shingle, the other one being out of contact because of the taper of the shingle. Hence the lay line is marked only at the butt end, and at an accurately predetermined distance from the butt end of the shingle being severed, so that it may serve as a gauge in laying the shingle.

The member 500 has been described as a spring member, and may extend across the inside of the arbor support 112. It is provided with a curved gate 510. This lies adjacent the shingle saw, and each shingle, as it is being severed from the block, engages this gate 510 and pushes it aside slightly to pass between the gate and the shingle saw, so that the shingle may not curl back, but is held steady during the trimming, lay-lining, and severing operations, yet all parts being supported by flexible members, they are yieldable to small irregularities in thickness. The gate 510 serves to prevent reverse movement of the shingle after it has been severed and while the block is being withdrawn from the shingle saw.

It has been observed in practice that the trimming saws, being finer than any of the saws previously used on the block or for severing the shingles, and remaining in contact, rotating very rapidly, with the ends of the shingles, trim them accurately and very smoothly, and in effect polish the butt ends of the shingles, so that when the shingles are severed the two ends are accurately trimmed and parallel, and the sawyer need only trim the side edges of the shingles, but having a square and accurate butt to gauge by, can make the side edges exactly parallel and exactly at right angles to the butt. Such shingles have the further advantage that there is no excess material, and in addition to being a more desirable article commercially, will save the shipper a considerable amount in a car load by virtue of the weight of the waste material which has been eliminated.

What I claim as my invention is:

1. In combination with a shingle saw, a carriage reciprocable past said saw, and means to hold a block upon said carriage for severance therefrom of a shingle by the saw, two means normally disposed to engage the shingle to be sawed, prior to its engagement with the saw, at different points spaced longitudinally of the shingle, a common support for said two means, means operable at will to retract the support to remove the two means from shingle-engaging position, means automatically operable to hold the support in such retracted position, and means automatically operable in accordance with the movement of the carriage to release the holding means, and thus to permit return of the support and the two first means to shingle-engaging position.

2. Mechanism for performing an operation upon a shingle, for use with an upright shingle machine having a carriage reciprocable along a frame to advance a block into engagement with a shingle saw, said mechanism comprising two means vertically spaced and normally located to engage the block, immediately prior to severance of the shingle from the block, a support carried by the frame and supporting said two means, means operable at will to retract the support, with said means, from the normal shingle-engaging position, means automatically operable upon such retraction of the support to hold the support thus retracted, and means associated with the carriage, and automatically operable upon withdrawal movement of the carriage after its next advance towards the shingle saw, to return the support, with said block-engaging means, to normal shingle-engaging position.

3. Mechanism for lay-lining shingles, for use with an upright shingle machine having a carriage reciprocable along a frame to repeatedly advance a block, with top and bottom ends alternately canted outwardly of the plane of a shingle saw, into engagement with such saw, said mechanism comprising two marking elements spaced inwardly of the respective ends of the shingles to be sawed by a predetermined amount, and each terminating an equal distance outwardly of the plane of the shingle saw, whereby only the butt end of each shingle is engaged, during advance of the canted block towards the shingle saw, immediately prior to severance of the shingle from the block.

4. In combination with the mechanism defined in claim 3, means operable at will to retract such mechanism from the position described, to a position where the marking elements will not engage the shingle block as the latter advances towards the saw.

5. Mechanism for trimming and lay-lining shingles, for use with an upright shingle machine having a carriage reciprocable along a frame to repeatedly advance a block, with top and bottom ends alternately canted outwardly of the plane of the shingle saw, into engagement with such saw, said mechanism comprising two trimming saws spaced by the length of shingle desired, and disposed to engage and trim the block during its advance towards the shingle saw, and two marking elements spaced inside the respective trimmed ends by a distance equal to the exposure intended, and disposed to engage the face of the block, during its advance towards the shingle saw, at the outwardly canted end of such block.

6. Mechanism for trimming and lay-lining shingles, for use with an upright shingle machine having a carriage reciprocable along a frame to repeatedly advance a block, with top and bottom ends alternately canted outwardly of the plane of the shingle saw, into engagement with such saw, said mechanism comprising two trimming saws spaced by the length of shingle desired, and disposed to engage and trim the block during its advance towards the shingle saw, two marking elements spaced inside the respective trimmed ends by a distance equal to the exposure intended, and disposed to engage the face of the block, during its advance towards the shingle saw, at the outwardly canted end of such block, and means operable at will to retract said mechanism from such block-engaging position.

7. Mechanism for trimming shingles to length, for use with an upright shingle machine wherein a carriage reciprocates along a frame to repeatedly advance a carriage-mounted block into engagement with a shingle saw, said mechanism comprising an arbor vertically disposed adjacent the work edge of the shingle saw, two trimming saws on said arbor spaced apart a definite distance and disposed each inside the paths of the coresponding ends of the block, to engage the ends of a shingle immediately prior to its severance from the block, a support for said arbor, means suporting said support for movement towards and from the plane of the shingle saw, two means controllable by the sawyer to move the arbor support away from shingle-engaging position, spring means to return the arbor support to shingle-engaging position, and means operable by actuation of one only of said two means, to hold the arbor support retracted.

8. In combination with an upright shingle machine having a carriage reciprocable along a frame to repeatedly advance a carriage-mounted block into engagement with a shingle saw, and having a spur roll to hold the upper end of the block and a treadle to lift said spur roll from such engagement, a vertical arbor disposed adjacent the working edge of the shingle saw, two trimming saws on said arbor spaced apart a definite distance to engage the upper and lower ends of a shingle immediately prior to its severance from the block, means supporting the arbor for movement from such normal shingle-engaging position, means associated with the treadle to retract the arbor from such normal position upon movement of the treadle to raise the spur roll, means automatically operable to hold the arbor in such retracted position, and means on the carriage to release said holding means during return movement of the carriage following its next advance past the shingle saw.

9. In combination with an upright shingle machine having a carriage reciprocable along a frame to repeatedly advance a carriage-mounted block into engagement with a shingle saw, and having a spur roll to hold the upper end of the block and a treadle to lift said spur roll from such engagement, a vertical arbor disposed adjacent the working edge of the shingle saw, two trimming saws on said arbor spaced apart a definite distance to engage the upper and lower ends of a shingle immediately prior to its severance from the block, means supporting the arbor for movement from such normal shingle-engaging position, means associated with the treadle to retract the arbor from such normal position upon movement of the treadle to raise the spur roll, means automatically operable to hold the arbor in such retracted position, means on the carriage to release said holding means during return movement of the carriage following its next advance past the shingle saw, and further means operable by the sawyer to retract the arbor and to hold it retracted at will.

10. In combination with an upright shingle machine having a carriage reciprocable along a frame to repeatedly advance a carriage-mounted block into engagement with a shingle saw, and having a treadle connected for operation of devices on the carriage, a vertical arbor normally disposed adjacent the path of the block in its advance towards the shingle saw, two trimming saws spaced apart on said arbor sufficiently to engage the upper and lower ends of a shingle immediately prior to its severance from the block, a support for the arbor, mounted on the frame, a rock shaft disposed adjacent the treadle and carriage, means connecting the treadle to rock the rock shaft upon depression of the treadle, means operable by such rocking of the rock shaft to retract the arbor support and saws from normal shingle-engaging position, and to hold it in such retracted position, and means upon the carriage to effect return of the arbor support and saws to normal position, operable by return movement of the carriage, away from the shingle saw.

11. The combination of claim 10, wherein the connection between the treadle and rock shaft includes lost motion means permitting return of the treadle to position after its depression, without return of the arbor support to its normal position.

12. In combination with an upright shingle machine having a carriage reciprocable along a frame to repeatedly advance a carriage-mounted block into engagement with a shingle saw, and having a treadle connected for operation of devices on the carriage, a vertical arbor normally disposed adjacent the path of the block in its advance towards the shingle saw, two trimming saws spaced apart on said arbor sufficiently to engage the upper and lower ends of a shingle immediately prior to its severance from the block, a support for the arbor, mounted on the frame, a rock shaft disposed adjacent the treadle and carriage, means connecting the treadle to rock the rock shaft upon depression of the treadle, said means including means permitting return of the treadle to position after its depression, without return of the arbor support to its normal position, latch means engageable upon depression of the treadle to hold the arbor support and saws retracted, means on the carriage and operable by return movement of the carriage, away from the shingle saw, to release said latch means, and spring means operable upon such release to return the arbor support to its normal position.

13. In combination with an upright shingle machine having a carriage reciprocable along a frame to repeatedly advance a carriage-mounted block into engagement with a shingle saw, and having a treadle connected for operation of devices on the carriage, a vertical arbor normally disposed adjacent the path of the block in its advance towards the shingle saw, two trimming saws spaced apart on said arbor sufficiently to engage the upper and lower ends of a shingle immediately prior to its severance from the block, a support for the arbor, mounted on the frame, a rock shaft disposed adjacent the treadle and carriage, means connecting the treadle to rock the rock shaft upon depression of the treadle, said means including means permitting return of the treadle to position after its depression, without return of the arbor support to its normal position, latch means normally engageable to hold the arbor support and saws in normal position, spring means urging the arbor support away from such normal position, means associated with the rock shaft to release said latch upon depression of the treadle, and means on the carriage operable by return movement of the latter, away from the shingle saw, to reengage said latch means and thus to return the arbor support and saws to normal position.

14. In combination with an upright shingle machine having a carriage reciprocable along a frame to repeatedly advance a carriage-mounted block into engagement with a shingle saw, a vertical arbor and two trimming saws spaced apart thereon, and normally disposed to engage the upper and lower ends of a shingle immediately prior to its severance from the block by the shingle saw, a support for the arbor, mounted on the frame, means operable to permit retraction of the arbor support and saws from and their return to such normal position, and guard means automatically movable by such retracting movement into operative position in front of the trimming saws, and by return movement out of such operative position.

15. In combination with an upright shingle machine having a carriage reciprocable along a frame to repeatedly advance a carriage-mounted block into engagement with a shingle saw, a vertical arbor and two trimming saws spaced apart thereon, and normally disposed to engage the upper and lower ends of a shingle immediately prior to its severance from the block by the shingle saw, a support for the arbor, mounted on the frame, spring means urging the arbor support and saws away from such normal position, latch means and a tension member connecting the latter and the arbor support to hold the latter in normal position, means operable at will to release said latch means, a cam mounted upon the carriage, and a cam follower associated with the latch means, and engageable by the cam when the latch means has been released, to return the latch means to lacthed position, upon movement of the carriage away from the shingle saw, following its advance therepast.

16. The combination of claim 15, wherein the tension member includes a tensioning spring, and the cam includes a member operable following return of the latch means approximately to latching position, to tension the latter spring and to complete return of the latch means to latching position.

17. In combination with an upright shingle machine having a carriage reciprocable along a frame to repeatedly advance a carriage-mounted block into engagement with a shingle saw, a vertical arbor and two trimming saws spaced apart thereon, and normally disposed to engage the upper and lower ends of a shingle immediately prior to its severance from the block by the shingle saw, a support for the arbor, mounted on the frame, spring means urging the arbor support and saws away from such normal position, vertically movable latch means operatively connected to the arbor support to hold the latter in normal position, means operable at will to release said latch means, thereby permitting it to move upwardly, a cam mounted upon the carriage, and inclined upwardly from its end which is adjacent the shingle saw, towards its opposite end, and inclined with relation to the plane of reciprocation of the carriage, a roller associated with the latch means, and movable upward upon release of the latter into position to engage the higher end of the cam, and yieldable means supporting said roller for axial movement, while following the last-mentioned inclination of the cam, whereby upon return movement of the carriage, following its advance past the saw after release of the latch means, the roller is engaged with the cam, and the latter depresses the roller and associated latch means, to return the latter to latched position.

18. In combination with an upright shingle machine having a carriage reciprocable along a frame to repeatedly advance a carriage-mounted block into engagement with a shingle saw, a vertical arbor and two trimming saws spaced apart thereon, and normally disposed to engage the upper and lower ends of a shingle immediately prior to its severance from the block by the shingle saw, a support for the arbor, a post projecting from the frame, disposed normally to the plane of the shingle saw, whereon said arbor support is slidably received, spring means urging the arbor support and trimming saws along said post into retracted position, away from the plane of the shingle saw, latch means operatively connected to the arbor support to hold the same, in opposition to said spring means, in normal shingle-engaging position, means operable at will to release said latch means, for retraction of the arbor support, and means associated with the carriage, and automatically operable upon the latter's movement away from the shingle saw, following its advance after release of the latch means, to return the arbor support to normal position and to reengage the latch means to hold it in such position.

19. In combination with an upright shingle machine having a carriage reciprocable along a frame to repeatedly advance a carriage-mounted block into engagement with a shingle saw, a vertical arbor and two trimming saws spaced apart thereon, and normally disposed to engage the upper and lower ends of a shingle immediately prior to its severance from the block by the shingle saw, a support for the arbor, a post projecting from the frame, disposed normally to the plane of the shingle saw, whereon said arbor support is slidably and rotatably received, a steadying arm engaging the upper end of the arbor support, and pivotally mounted on the frame distant from the arbor, spring means urging the arbor support and trimming saws along said post into retracted position, away from the plane of the shingle saw, latch means operatively connected to the arbor support to hold the same, in opposition to said spring means, in normal shingle-engaging position, means operable at will to release said latch means, for retraction of the arbor support, and means associated with the carriage, and automatically operable upon the latter's movement away from the shingle saw, following its advance after release of the latch means, to return the arbor support to normal position and to reengage the latch means to hold it in such position.

20. Mechanism for trimming and lay-lining shingles, for use with an upright shingle machine having a carriage reciprocable along a frame to repeatedly advance a carriage-mounted block into engagement with a shingle saw, said mechanism comprising an arbor and two trimming saws spaced apart thereon, and normally disposed to engage the upper and lower ends of a shingle immediately prior to its severance from the block by the shingle saw, a support for the arbor, a shingle gate mounted on said support and yieldingly engaging the shingle during its severance, and two marking elements carried by said shingle gate and spaced inside the planes of the trimming saws to engage the butt end of each shingle a predetermined distance from its trimmed butt.

21. Mechanism for trimming and lay-lining shingles, for use with an upright shingle machine having a carriage reciprocable along a frame to repeatedly advance a carriage-mounted block into engagement with a shingle saw, said mechanism comprising an arbor and two trimming saws spaced apart thereon, and normally disposed to engage the upper and lower ends of a shingle immediately prior to its severance from the block by the shingle saw, a support for the arbor, a shingle gate mounted on said support and yieldingly engaging the shingle during its severance, two marking elements carried by said shingle gate and spaced inside the planes of the trimming saws to engage the butt end of each shingle a predetermined distance from its trimmed butt, means to vary the spacing of the trimming saws on said arbor, and means to correspondingly adjust the spacing of the marking elements.

22. In combination with a shingle saw and arbor, an arm hingedly mounted on an axis extending substantially radially of the saw arbor, a support depending from the swinging end of said arm, an arbor journaled in said support, a pair of trimming saws spaced apart on said latter arbor, drive means for the latter arbor extending along said arm, and means associated with the shingle saw arbor to deliver power to said drive means, and thence to the trimming saws.

23. In combination with a shingle saw and arbor, an arm hingedly mounted on an axis extending substantially radially of the saw arbor, a support depending from the swinging end of said arm, an arbor journaled in said support, a pair of trimming saws spaced apart on said latter arbor, drive means for the latter arbor extending along said arm, means associated with the shingle saw arbor to deliver power to said drive means, and thence to the trimming saws, and means to swing said arm towards and from the plane of the shingle saw.

24. In combination with a shingle saw and collar, an arm hingedly mounted adjacent the saw on an axis extending substantially radially of the saw's axis, a support depending from the swinging end of the arm, an arbor journaled in said support, a pair of trimming saws spaced apart on said arbor, drive means for said arbor including a shaft extending in the hinge axis of said arm, and carrying a friction drive element engageable with the collar, and means to move said friction element into and from engagement with the collar.

25. In combination with a shingle saw and collar, an arm hingedly mounted adjacent the saw on an axis extending substantially radially of the saw's axis, a support depending from the swining end of the arm, an arbor journaled in said support, a pair of trimming saws spaced apart on said arbor, drive means for said arbor including a shaft extending in the hinge axis of said arm, and carrying a friction drive element engageable with the collar, means to move said friction element into and from engagement with the collar, and means independent of the latter means to swing the arbor and trimming saws away from and towards the plane of the shingle saw.

26. In combination with a shingle machine including a shingle saw, a carriage guided for reciprocation past the saw, and means to hold a block upon the carriage, a trimming saw normally disposed to engage the block prior to the latter's engagement with the shingle saw, a gate disposed adjacent the saw, on the side opposite the carriage, and normally yieldingly urged towards the plane of the saw to permit advance of a shingle being sawed, but preventing its return, means operable at will to retract the gate and the trimming saw from such position to permit free passage of material sawed from the block, and means automatically operable by movement of the carriage away from the shingle saw, to return the trimming saw and gate to their normal positions.

27. Mechanism for trimming shingles to length, for use with an upright shingle machine having a carriage reciprocable along a frame to repeatedly advance a carriage-mounted block into engagement with a shingle saw, said mechanism comprising two trimming saws disposed adjacent the path of the block on its advance towards the shingle saw, and spaced to engage opposite ends of a shingle prior to its severance from the block, each trimming saw being disposed in a plane normal to the plane of the shingle saw, and parallel to the direction of movement of the carriage and block, and means to adjust the position of the trimming saws relative to the shingle saw, to vary their relative position towards and from the plane of the shingle saw, thus to control the depth of the cut of each trimming saw, and normalcy of the latter's plane to the plane of the shingle saw, or to vary the angularity of their axes in a plane parallel to the plane of the shingle saw, thus to preserve parallelism of the trimming saws' planes to the direction of movement of the block.

28. A machine for sawing shingles comprising a shingle saw, a carriage reciprocable past said saw, means on said carriage to hold a block in position for severance therefrom of a shingle by the saw, means operable by the sawyer to release said holding means, means normally disposed to engage the shingle to be sawed, in its advance towards the saw, to perform an operation thereon, means operable by said releasing means to retract the last-mentioned means coincident with release of the block, means automatically operable by reciprocation of the carriage, upon its return stroke after an advance with said means retracted, to redispose said means in its normal position, and other means, operable by the sawyer independently of the releasing means, to retract the operating means at will.

29. In combination with a shingle machine including a shingle saw, a carriage guided for reciprocation past the saw, and means to hold a block upon the carriage, a trimming saw disposed to engage the block prior to the latter's engagement with the shingle saw, a gate disposed adjacent the saw, on the side opposite the carriage, and yieldingly urged towards the plane of the saw to permit advance of a shingle being sawed, but preventing its return, and means to retract the trimming saw, and the gate, at will, from the path of the block.

30. Mechanism for trimming shingles to length, for use with an upright shingle machine having a carriage reciprocable along a frame to repeatedly advance a carriage-mounted block into engagement with a shingle saw, said mechanism comprising two trimming saws disposed adjacent the path of the block on its advance towards the shingle saw, and spaced to engage opposite ends of a shingle prior to its severance from the block, each trimming saw being disposed in a plane normal to the plane of the shingle saw, and parallel to the direction of movement of the carriage and block, means to adjust the trimming saws to maintain their axes parallel to the plane of the shingle saw, and further means to adjust the trimming saws towards and from the plane of the shingle saw, to control the depth of their cut.

31. Mechanism for trimming shingles to length, for use with an upright shingle machine having a carriage reciprocable along a frame to repeatedly advance a carriage-mounted block into engagement with a shingle saw, said mechanism comprising two trimming saws disposed adjacent the path of the block on its advance towards the shingle saw, and spaced to engage opposite ends of a shingle prior to its severance from the block, each trimming saw being disposed in a plane normal to the plane of the shingle saw, and parallel to the direction of movement of the carriage and block, means to adjust the trimming saws to dispose their planes in parallelism with the direction of movement of the block, and further means to adjust the trimming saws to maintain their planes normal to the plane of the trimming saw.

32. Mechanism for trimming shingles to length, for use with an upright shingle machine having a carriage reciprocable along a frame to repeatedly advance a carriage-mounted block into engagement with a shingle saw, said mechanism comprising two trimming saws disposed adjacent the path of the block on its advance towards the shingle saw, and spaced to engage opposite ends of a shingle prior to its severance from the block, each trimming saw being disposed in a plane normal to the plane of the shingle saw, and parallel to the direction of movement of the carriage and block, means to adjust the trimming saws to dispose their planes in parallelism with the direction of movement of the block, further means to adjust the trimming saws to maintain their planes normal to the plane of the trimming saw, and further means to adjust the trimming saws towards and from the plane of the shingle saw, thus to control the depth of their cut.

MATT WILLIAM KOSKI.